United States Patent
Chung (10) Patent No.: US 11,248,620 B2
(45) Date of Patent: Feb. 15, 2022

(54) ELECTRIC BLOWER WITH AN AXIAL FAN AND MOTOR FOR SWEEPING AND CLEANING

(71) Applicant: TECHTRONIC CORDLESS GP, Anderson, SC (US)

(72) Inventor: Koon For Chung, Kwai Chung (HK)

(73) Assignee: Techtronic Cordless GP, Anderson, SC (US)

( * ) Notice: Subject to any disclaimer, the term of this patent is extended or adjusted under 35 U.S.C. 154(b) by 24 days.

(21) Appl. No.: 16/574,664

(22) Filed: Sep. 18, 2019

(65) Prior Publication Data
US 2020/0096001 A1    Mar. 26, 2020

(30) Foreign Application Priority Data

Sep. 21, 2018  (EP) ..................................... 18196082

(51) Int. Cl.
| | |
|---|---|
| *F04D 29/32* | (2006.01) |
| *A01G 20/47* | (2018.01) |
| *F04D 25/06* | (2006.01) |
| *F04D 29/26* | (2006.01) |

(52) U.S. Cl.
CPC .......... *F04D 29/325* (2013.01); *A01G 20/47* (2018.02); *F04D 25/0673* (2013.01); *F04D 29/263* (2013.01)

(58) Field of Classification Search
CPC .. F04D 29/325; F04D 25/0673; F04D 29/263; F04D 25/084; A01G 20/47
See application file for complete search history.

(56) References Cited

U.S. PATENT DOCUMENTS

| | | |
|---|---|---|
| 5,652,995 A | 8/1997 | Henke et al. |
| 2008/0089785 A1 | 4/2008 | Schliemann et al. |
| 2011/0008170 A1* | 1/2011 | Suzuki .................. F04D 29/667 416/191 |
| 2011/0275302 A1* | 11/2011 | Tarada .................. F04D 29/547 454/166 |

(Continued)

FOREIGN PATENT DOCUMENTS

| | | |
|---|---|---|
| DE | 1428272 A1 | 1/1969 |
| WO | WO2018028639 A1 | 2/2018 |

OTHER PUBLICATIONS

European Office Action Corresponding to Application No. 18196082.4 dated Oct. 19, 2021.

*Primary Examiner* — Patrick Hamo
(74) *Attorney, Agent, or Firm* — Dority & Manning, P.A.

(57) ABSTRACT

An electric blower (10) is disclosed as including a brushless motor (16), and an axial fan (18, 18C) driven by the motor, the motor being operable at a first speed of rotation of 15,000 revolutions per minute (rpm) and a second speed of rotation of 18,000 rpm, the axial fan including a hub (34C) and a plurality of fan blades (36C) engaged with the hub, the hub having a hub diameter ($\phi_H$), the axial fan having an outer diameter ($\phi_T$), and $$\frac{\phi_H}{\phi_T}$$

being between substantially 0.6 and substantially 0.65.

20 Claims, 7 Drawing Sheets

(56) References Cited

U.S. PATENT DOCUMENTS

| | | | |
|---|---|---|---|
| 2013/0202443 A1* | 8/2013 | Tzeng | F01D 5/34 |
| | | | 416/223 R |
| 2014/0230181 A1* | 8/2014 | Yamaoka | A01G 20/43 |
| | | | 15/344 |
| 2016/0169249 A1 | 6/2016 | Takahashi et al. | |
| 2017/0252760 A1* | 9/2017 | Campbell | B05B 7/2416 |
| 2018/0087513 A1* | 3/2018 | Hoffman | F04D 19/02 |
| 2018/0140146 A1 | 5/2018 | Shu et al. | |
| 2018/0228326 A1 | 8/2018 | Crichton et al. | |

* cited by examiner

ELECTRIC BLOWER WITH AN AXIAL FAN AND MOTOR FOR SWEEPING AND CLEANING

The present application is based on and claims priority to European Patent Application No. 18196082.4 having a filing date of Sep. 21, 2018, which is incorporated by reference herein.

This invention relates to an electric blower, such as an electric blower suitable for, but not limited to, sweeping and cleaning purposes.

There are commercially available electric blowers which are powered by electric batteries. Lightweight and compact battery packs generally supply limited electric power (e.g. less than 630 W) due to commercial technology limitations and reliability considerations. The sweeping nozzle end of the blower should be designed by reducing the passage sectional area to limit the flow rate and thus increase the air speed. However, resistance of the system would be changed according to such changes in pressure and flow rate.

It is thus an object of the present invention to provide an electric blower in which the aforesaid shortcomings are mitigated, or at least to provide a useful alternative to the trade and public.

According to the present invention, there is provided an electric blower including a motor, and an axial fan driven by said motor, wherein said motor is operable at a first speed of rotation of substantially 15,000 revolutions per minute (rpm) and a second speed of rotation of substantially 18,000 rpm, wherein said axial fan includes a hub and a plurality of fan blades engaged with said hub, wherein said hub has a hub diameter ($\phi_H$), wherein said axial fan has an outer diameter ($\pi_T$), and wherein $$\frac{\phi_H}{\phi_T}$$

is between substantially 0.6 and substantially 0.65.

An electric blower according to an embodiment of the present invention will now be described, by way of example only, with reference to the accompany drawings, in which.

An electric blower according to an embodiment of the present invention is shown in FIGS. 1 to 5, and generally designated as 10. The electric blower 10 is powered by an electric battery pack 12 detachably engaged with a body 14 of the electric blower 10. The body 14 houses a motor 16 (e.g. a brushless motor) and an axial fan 18. When a switch 20 below a gripping handle 22 of the body 14 is activated (e.g. by a user), the electric battery pack 12 will power the motor 16 to drive the axial fan 18 into rotation. An auxiliary switch 24 on a side of the gripping handle 22 is operable (e.g. by a user) to change the speed of rotation of the motor 16 between a first lower speed of 15,000 revolutions per minute (rpm) and a second higher speed of 18,000 rpm.

Upon rotation of the axial fan 18, air is drawn into the body 14 of the electric blower 10 through a number of air inlets 26 at and adjacent a rear end of the electric blower 10. Such drawn-in air is then forced to flow through the axial fan 18 in an axial direction along a longitudinal axis M-M of and through an air duct 28 within an elongate air tube 30 of the body 14. Such air eventually is blown by the axial fan 18 out of the air duct 28 of the elongate air tube 30 of the body 14 through an air outlet 32 of a nozzle 33 at a front end of the air tube 30.

Study on the geometry of the axial fan 18 has been carried out with a view to optimizing the flow rate and velocity of air blown out of the air outlet 32 of the nozzle 33 of the air tube 30 of the electric blower 10. As mentioned above, the motor 18 of the electric blower 10 is set to run at two different rotation speeds, namely 15,000 rpm and 18,000 rpm. It is found that these two rotational speeds are reasonable to both mechanical and electrical design.

In case of limited rotational speed, it is possible to increase the air flow rate and air flow velocity by a higher blade attack angle, a larger blade tip radius, a lower hub radius, and a longer blade axial width. However, amperage loading would be increased exponentially with such changes. In most cases, the system efficiency will drop if unstable air flow occurs, which will result in higher air flow friction and system resistance.

Figure 6A:
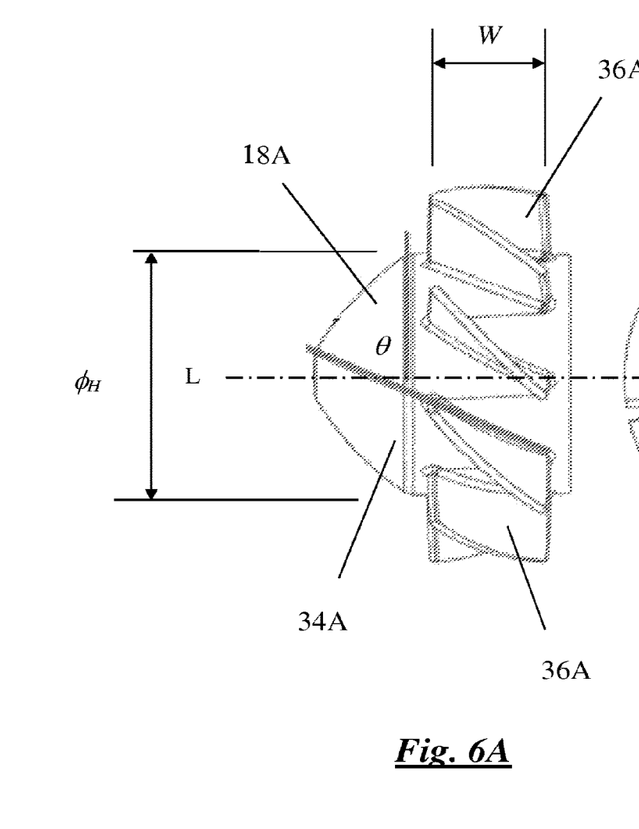
FIG. 6A is a side view of a first axial fan used in experiments conducted for the purpose of the present invention.
Figure 6B:
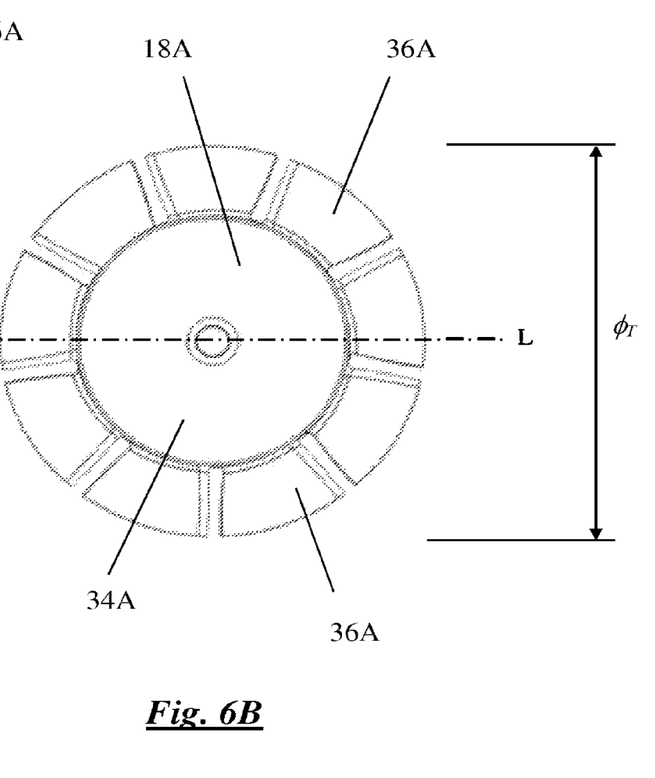
FIG. 6B is a top view of the axial fan of FIG. 6A.
Figure 7A:
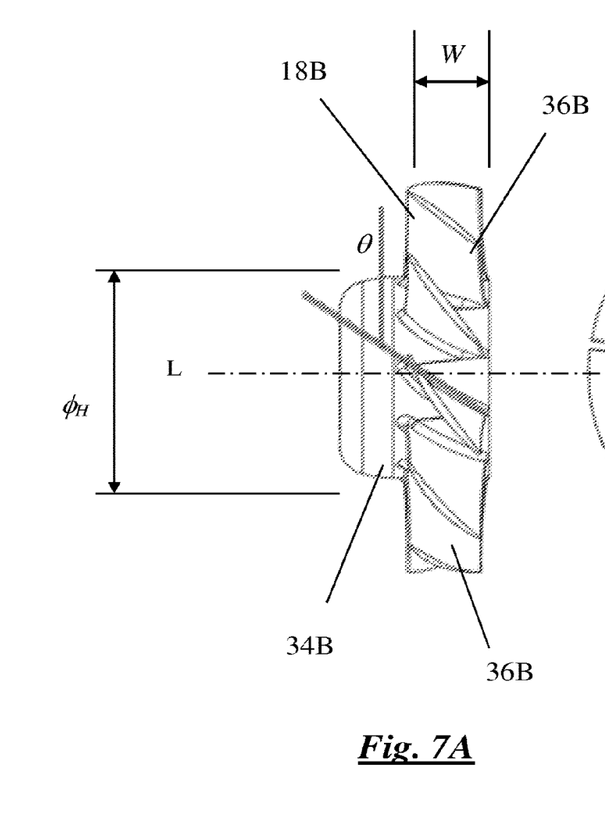
FIG. 7A is a side view of a second axial fan used in experiments conducted for the purpose of the present invention.
Figure 7B:
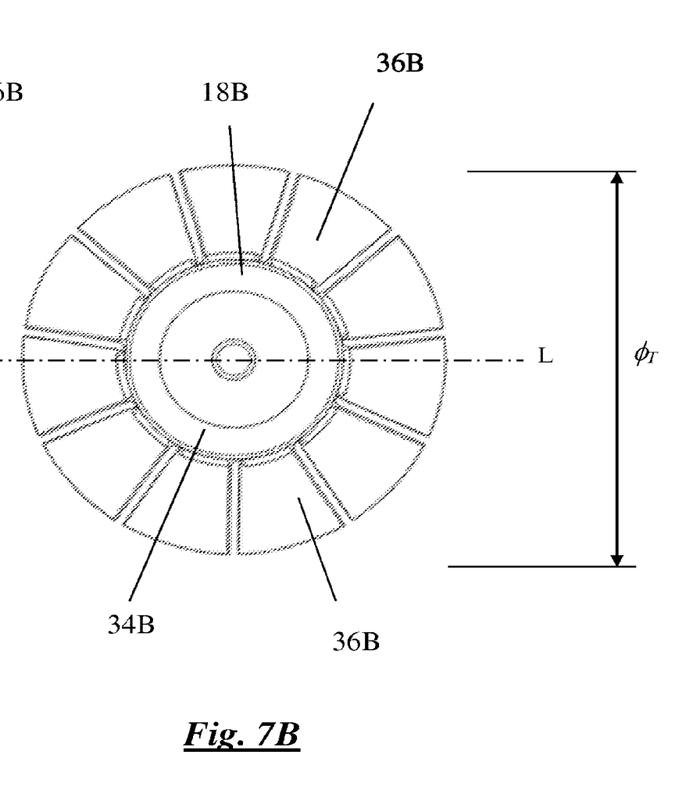
FIG. 7B is a top view of the axial fan of FIG. 7A.
Figure 8A:
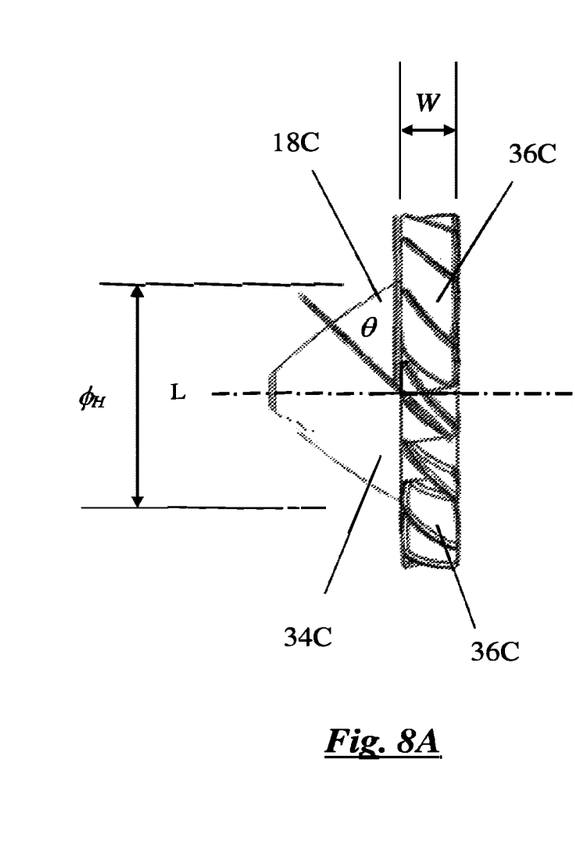
FIG. 8A is a side view of a third axial fan used in experiments conducted for the purpose of the present invention.
Figure 8B:
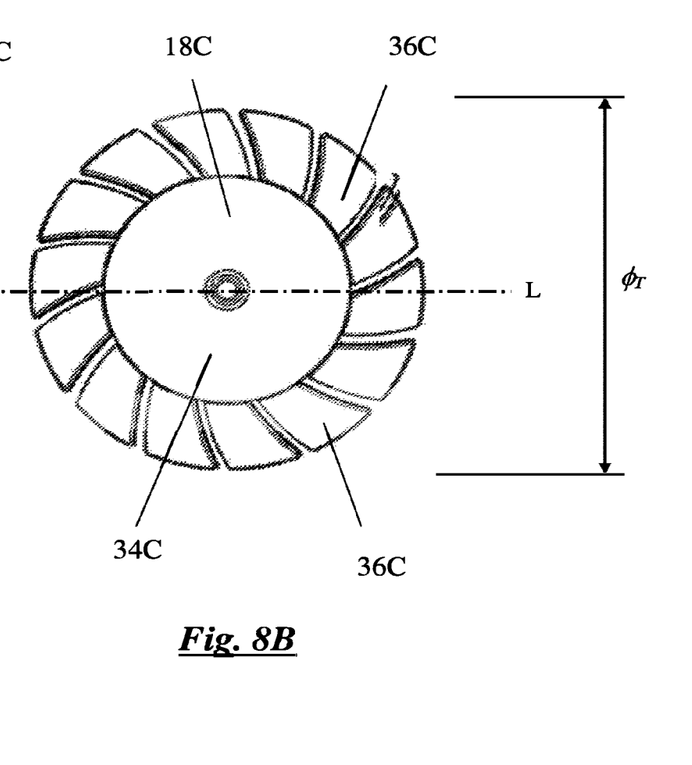
FIG. 8B is a top view of the axial fan of FIG. 8A.

Experiments on three axial fans 18A, 18B, 18C of different geometry were carried out, in which FIGS. 6A and 6B show a first axial fan 18A, FIGS. 7A and 7B show a second axial fan 18B, and FIGS. 8A and 8B show a third axial fan 18C. The axial fan 18A has a hub 34A and a number of fan blades 36A fixedly engaged therewith for simultaneous movement; the axial fan 18B has a hub 34B and a number of fan blades 36B fixedly engaged therewith for simultaneous movement; and the axial fan 18C has a hub 34C and a number of fan blades 36C fixedly engaged therewith for simultaneous movement. Various relevant dimensions of the axial fans 18A, 18B and, 18C are shown in Table 1 below:

TABLE 1

|  | $\phi_T$ | $\phi_H$ | $\frac{\phi_H}{\phi_T}$ | W | $\frac{W}{\phi_T}$ | θ |
|---|---|---|---|---|---|---|
| Axial Fan 18A | 78 mm | 49.5 mm | 0.635 | 25 mm | 0.321 | 58° |
| Axial Fan 18B | 94.5 mm | 48 mm | 0.508 | 19 mm | 0.201 | 54° |
| Axial Fan 18C | 95.5 mm | 60 mm | 0.628 | 14 mm | 0.147 | 50° | wherein:
$\phi_T$ is the outer diameter (also called the "tip diameter") of the respective axial fan 18A, 18B, 18C;

$\phi_H$ is the diameter of the hub 34A, 34B, 34C of the respective axial fan 18A, 18B, 18C;

W is the axial width of fan blades 36A, 36B, 36C along a longitudinal axis L-L of the respective axial fan 18A, 18B, 18C; and θ is the angle ("attack angle") between a plane perpendicular to the longitudinal axis L-L of the respective axial fan 18A, 18B, 18C and a line where the respective fan blade 36A, 36B, 36C joins the respective hub 34A, 34B, 34C of the respective axial fan 18A, 18B, 18C.

Table 2A below shows various results of experiments conducted on the axial fans 18A, 18B, and 18C at a motor rotational speed of 15,000 rpm and Table 2B shows various results of experiments conducted on the axial fans 18A, 18B, and 18C at a motor rotational speed of 18,000 rpm.

TABLE 2A

| | Input Power (Watt) | Flow Rate (Cubic Feet per Minute) | Air Flow Velocity (Miles per Hour) |
|---|---|---|---|
| Axial Fan 18A | 150 | 204 | 76 |
| Axial Fan 18B | 380 | 235 | 68 |
| Axial Fan 18C | 344 | 267 | 77 |

TABLE 2B

| | Input Power (Watt) | Flow Rate (Cubic Feet per Minute) | Air Flow Velocity (Miles per Hour) |
|---|---|---|---|
| Axial Fan 18A | 370 | 239 | 89 |
| Axial Fan 18B | 690 | 294 | 86 |
| Axial Fan 18C | 550 | 314 | 90 |

According to the above experimental results, it can be seen that the axial fan 18C is the most efficient design in achieving the desired output airflow velocity and rate of air flow. In particular, it can be seen that, in the axial fan 18C:

$$\frac{\phi_H}{\phi_T}$$

is between 0.6 and 0.65, $$\frac{W}{\phi_T}$$

is between 0.14 and 0.15, $\phi_H$ is 60 mm, $\phi_T$ is 95.5 mm,

W is between 13.5 mm and 15 mm, in particular 14 mm, and

θ is below 500, e.g. between 45° and 50°.

Figure 1:
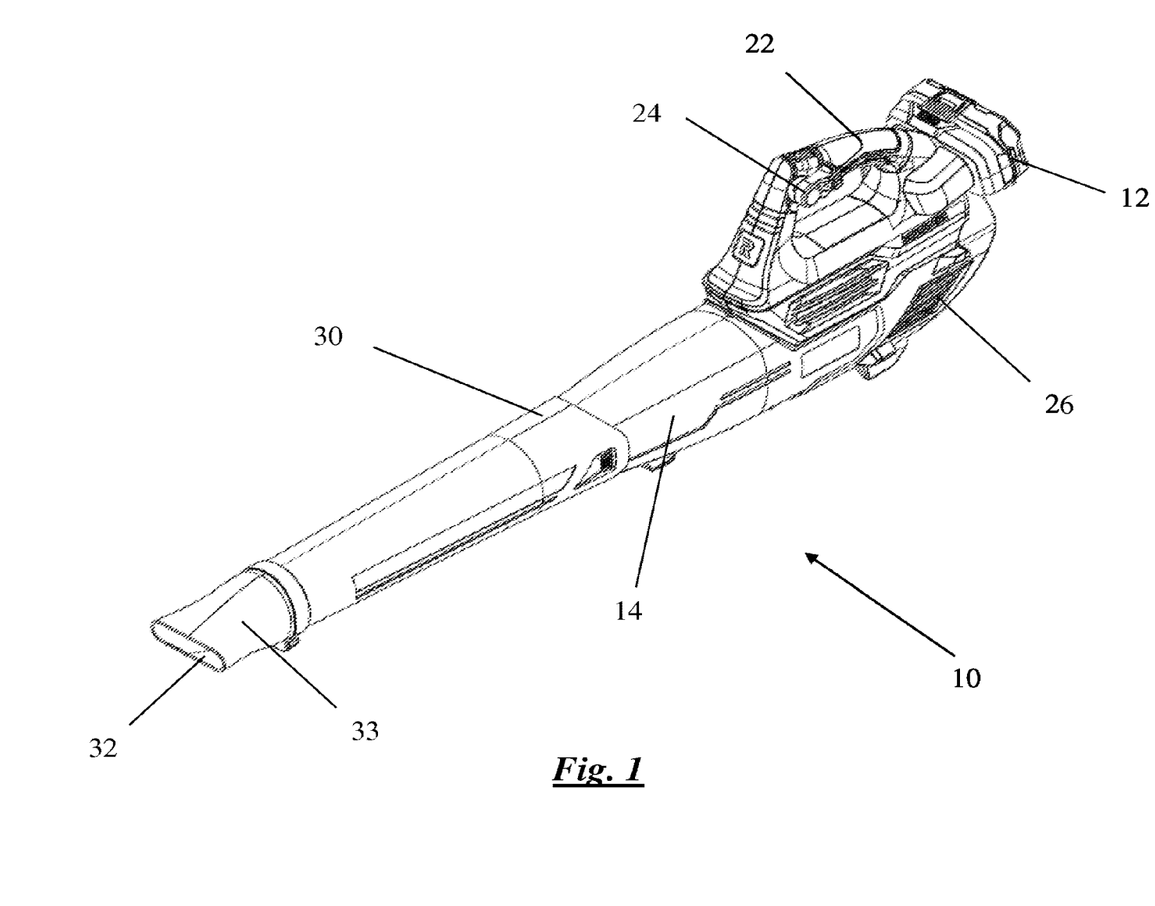
FIG. 1 is a perspective view of an electric blower according to an embodiment of the present invention.
Figure 2:
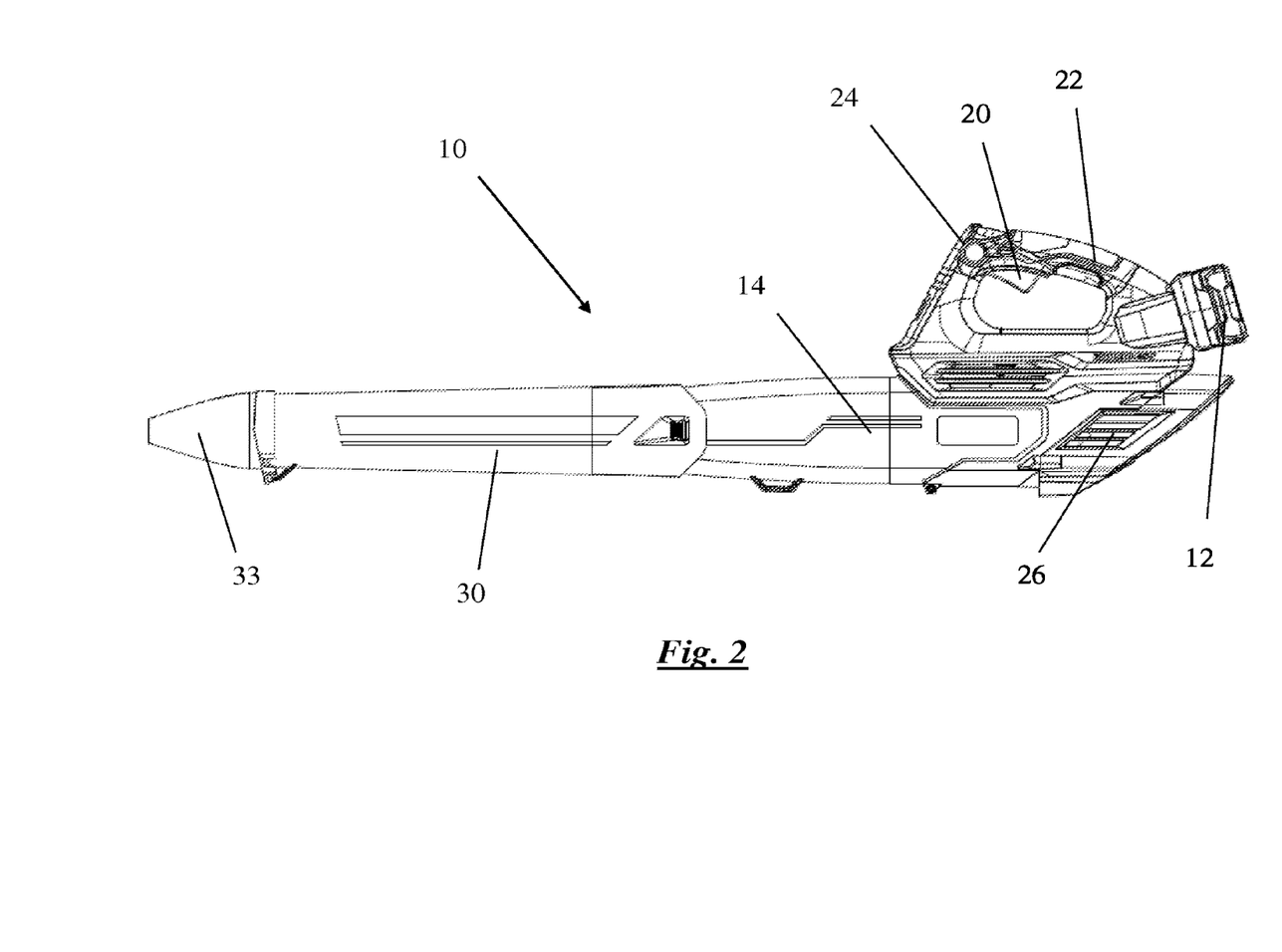
FIG. 2 is a side view of the electric blower of FIG. 1.
Figure 3:
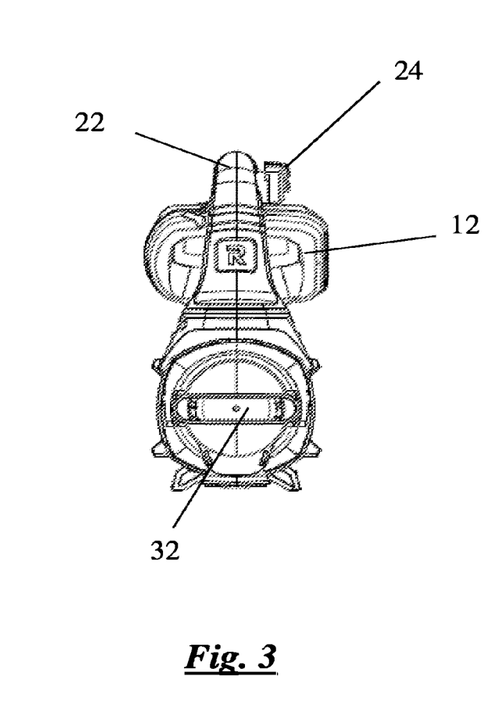
FIG. 3 is a front view of the electric blower of FIG. 1.
Figure 4:
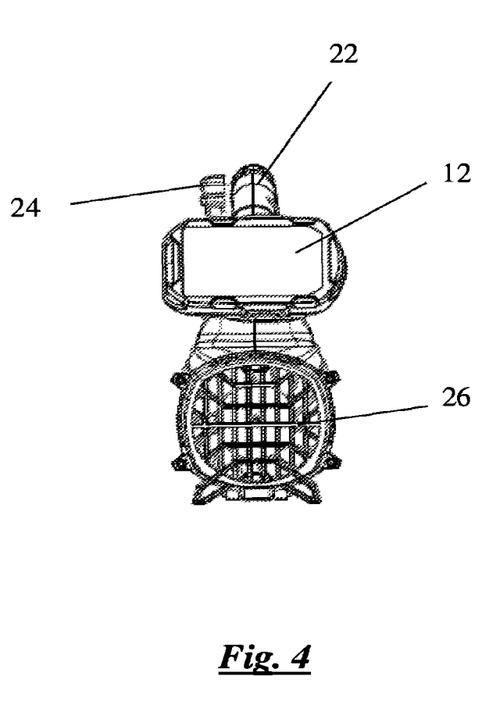
FIG. 4 is a rear view of the electric blower of FIG. 1.
Figure 5:
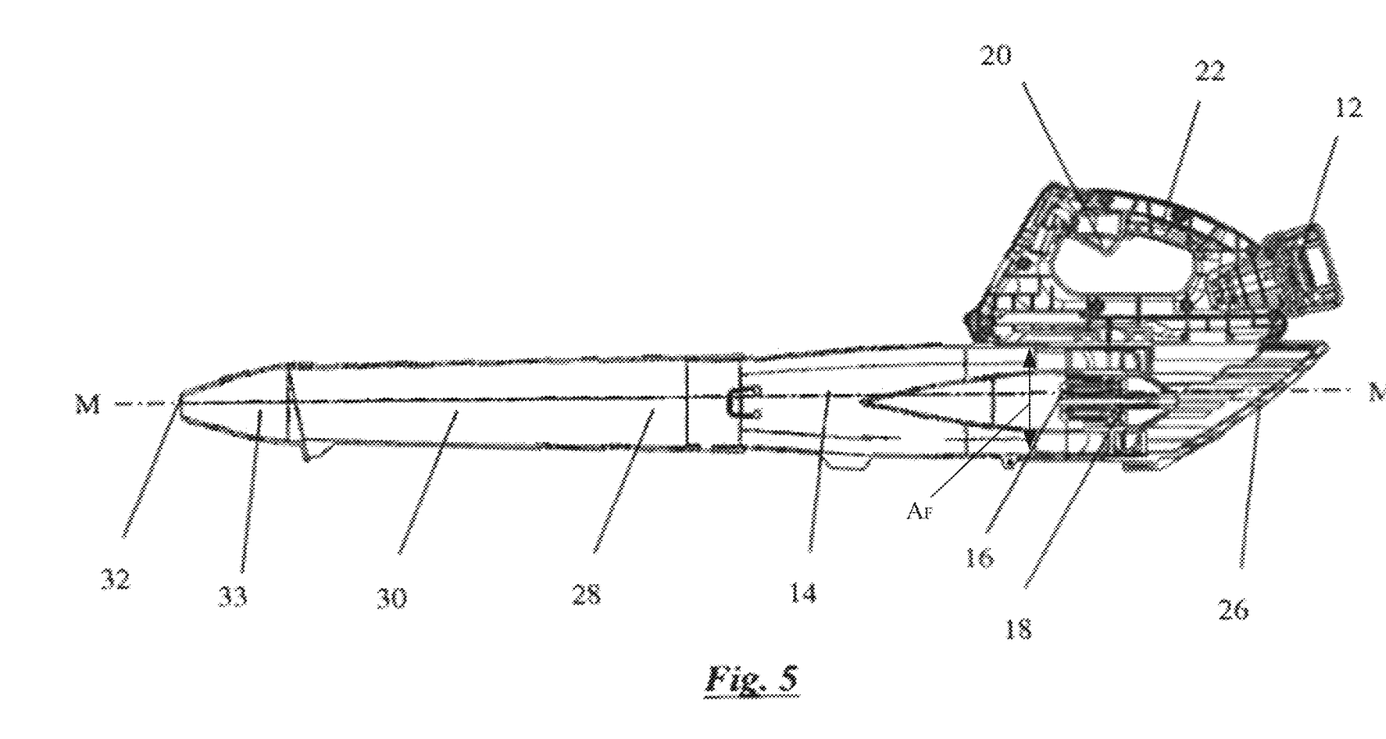
FIG. 5 is longitudinal sectional view of the electric blower of FIG. 1.

The electric blower 10 has a sweep nozzle design allowing the user to control the air stream blowing zone and/or increase the air speed for focused lift up debris and/or avoid blowing up dust in closed ground area. It is found that the ratio between the area ($A_O$) of the air outlet 32 at the front end of the nozzle 33 of the air tube 30 of the electric blower 10 and the flow through area at fan position ($A_F$) of the electric blower 10 also affects the performance of the electric blower 10.

Table 3A below shows various experimental results on an axial fan 18 at a motor rotational speed of 15,000 rpm with different $$\frac{A_O}{A_F}$$

ratios, and Table 3B shows various experimental results on an axial fan 18 at a motor rotational speed of 18,000 rpm with different $$\frac{A_O}{A_F}$$

ratios.

TABLE 3A

| Flow Through Area at Fan Position ($A_F$) (mm²) | Air Outlet Area ($A_O$) (mm²) | $\frac{A_O}{A_F}$ | Air Flow Velocity (Miles per Hour) | Flow Rate (Cubic Feet per Minute) | Amperage |
|---|---|---|---|---|---|
| 4831.5 | 3674.5 | 0.76 | 94 | 324 | 18.56 |
| | 2324.3 | 0.48 | 89 | 193 | 16.54 |
| | 1385.4 | 0.29 | 132 | 164 | 16.5 |
| | 907.9 | 0.19 | 120 | 103 | 19.3 |

TABLE 3B

| Flow Through Area at Fan Position ($A_F$) (mm²) | Air Outlet Area ($A_O$) (mm²) | $\frac{A_O}{A_F}$ | Air Flow Velocity (Miles per Hour) | Flow Rate (Cubic Feet per Minute) | Amperage |
|---|---|---|---|---|---|
| 4831.5 | 3674.5 | 0.76 | 113 | 387 | 30.5 |
| | 2324.3 | 0.48 | 109 | 236 | 29 |
| | 1385.4 | 0.29 | 162 | 200 | 27.2 |
| | 907.9 | 0.19 | 125 | 146 | 32.8 |

It can be seen from the above experimental data that the electric blower 10 is of the best performance in terms of air speed and rate of reduction in flow rate when $$\frac{A_O}{A_F}$$

is close to 0.3, e.g. between 0.25 and 0.35.

It should be understood that the above only illustrates and describes an example whereby the present invention may be carried out, and that modifications and/or alterations may be made thereto without departing from the spirit of the invention. It should also be understood that various features of the present invention which are, for brevity, described in the context of a single embodiment, may also be provided separately or in any appropriate sub-combinations.

The invention claimed is:

1. An electric blower comprising:
   a motor, and
   a single axial fan driven by said motor,
   wherein said motor is operable at a first speed of rotation and a second speed of rotation different than the first speed of rotation,
   wherein said axial fan has a single stage including a hub and a plurality of fan blades engaged with said hub, wherein said hub has a hub diameter ($\varnothing_H$),
wherein said axial fan has an outer diameter ($\varnothing_T$), and
wherein $$\frac{\phi H}{\phi T}$$

is between substantially 0.6 and substantially 0.65.

2. An electric blower according to claim 1, wherein each of said fan blades has an axial width (W), and wherein $$\frac{W}{\phi T}$$

is between substantially 0.14 and 0.15.

3. An electric blower according to claim 1, wherein $\varnothing_H$ is substantially 60 mm.

4. An electric blower according to claim 1, wherein $\varnothing_T$ is substantially 95.5 mm.

5. An electric blower according to claim 2, wherein W is between substantially 13.5 mm and 15 mm.

6. An electric blower according to claim 1, wherein each of said fan blades has an attack angle (Ø) of between substantially 45° and 50°.

7. An electric blower according to claim 1, further including a nozzle with an outlet allowing outflow of air from said electric blower through said outlet, said outlet having an area ($A_O$).

8. An electric blower according to claim 7, wherein $$\frac{A_O}{A_F}$$

is between substantially 0.25 and substantially 0.35, and wherein $A_F$ is a flow through area at the axial fan position.

9. An electric blower according to claim 8, wherein $$\frac{A_O}{A_F}$$

is substantially 0.3.

10. The electric blower of claim 1, further comprising
a body having a handle; and
a detachable battery disposed at a rear end of the body above an air inlet,
wherein the motor is electrically coupled with the detachable battery, and
wherein the axial fan is disposed downstream of the air inlet below the handle.

11. An electric blower comprising:
a body having a handle;
a detachable battery disposed at a rear end of the body above an air inlet;
a motor electrically coupled with the battery; and
a single-stage axial fan driven by said motor and disposed below the handle,
wherein said motor is operable at a first speed of rotation and a second speed of rotation different than the first speed of rotation,
wherein said axial fan includes a hub and a plurality of fan blades engaged with said hub,
wherein said hub has a hub diameter ($\varnothing_H$),
wherein said axial fan has an outer diameter ($\varnothing_T$), and
wherein $$\frac{\phi H}{\phi T}$$

is between substantially 0.6 and substantially 0.65.

12. An electric blower according to claim 11, wherein each of said fan blades has an axial width (W), and wherein $$\frac{W}{\phi T}$$

is between substantially 0.14 and 0.15.

13. An electric blower according to claim 11, wherein $\varnothing_H$ is substantially 60 mm.

14. An electric blower according to claim 11, wherein $\varnothing_T$ is substantially 95.5 mm.

15. An electric blower according to claim 12, wherein W is between substantially 13.5 mm and 15 mm.

16. An electric blower according to claim 11, wherein each of said fan blades has an attack angle (Ø) of between substantially 45° and 50°.

17. An electric blower according to claim 11, further including a nozzle with an outlet allowing outflow of air from said electric blower through said outlet, said outlet having an area ($A_O$).

18. An electric blower according to claim 17, wherein $$\frac{A_O}{A_F}$$

is between substantially 0.25 and substantially 0.35, and wherein $A_F$ is a flow through area at the axial fan position.

19. An electric blower according to claim 18, wherein $$\frac{A_O}{A_F}$$

is substantially 0.3.

20. An electric blower comprising:
a body having a handle;
a detachable battery disposed at a rear end of the body above an air inlet;
a motor electrically coupled with the battery;
a single-stage axial fan driven by said motor; and
a nozzle with an outlet allowing outflow of air from said electric blower through said outlet, said outlet having an area ($A_O$),
wherein said motor is operable at a first speed of rotation and a second speed of rotation different than the first speed of rotation,
wherein said axial fan includes a hub and a plurality of fan blades engaged with said hub,
wherein said hub has a hub diameter ($\varnothing_H$),
wherein said axial fan has an outer diameter ($\varnothing_T$), wherein $$\frac{\phi H}{\phi T}$$

is between substantially 0.6 and substantially 0.65, and wherein $$\frac{A_O}{A_F}$$

is between substantially 0.25 and substantially 0.35, and wherein $A_F$ is a flow through area at the axial fan position.

* * * * *